US012773768B2

(12) United States Patent
Koskimaki et al.

(10) Patent No.: US 12,773,768 B2
(45) Date of Patent: Oct. 27, 2026

(54) CONTROL VALVE AND IMPACT DEVICE

(71) Applicant: SANDVIK MINING AND CONSTRUCTION OY, Tampere (FI)

(72) Inventors: Antti Koskimaki, Tampere (FI); Timo Kela, Tampere (FI); Mikko Hamalainen, Tampere (FI); Lars Kandelin, Tampere (FI)

(73) Assignee: Sandvik Mining and Construction Oy, Tampere (FI)

( * ) Notice: Subject to any disclaimer, the term of this patent is extended or adjusted under 35 U.S.C. 154(b) by 0 days.

(21) Appl. No.: 18/855,477

(22) PCT Filed: Apr. 6, 2023

(86) PCT No.: PCT/EP2023/059116

§ 371 (c)(1),
(2) Date: Oct. 9, 2024

(87) PCT Pub. No.: WO2023/198585

PCT Pub. Date: Oct. 19, 2023

(65) Prior Publication Data

US 2025/0187166 A1 Jun. 12, 2025

(30) Foreign Application Priority Data

Apr. 13, 2022 (EP) .................................... 22168155

(51) Int. Cl.
*B25D 9/16* (2006.01)
*F16K 11/078* (2006.01)

(52) U.S. Cl.
CPC .............. *B25D 9/16* (2013.01); *F16K 11/078* (2013.01); *B25D 2222/72* (2013.01)

(58) Field of Classification Search
CPC .................. B25D 9/16; B25D 2222/72; B25D 2209/005; B25D 9/22; B25D 9/20;
(Continued)

(56) References Cited

U.S. PATENT DOCUMENTS 3,051,191 A * 8/1962 Schollhammer ........ F15B 13/12 137/332
3,807,454 A 4/1974 Westveer
(Continued)

FOREIGN PATENT DOCUMENTS

DE 102005030173 A1 1/2007
EP 2718064 B1 8/2015
(Continued)

*Primary Examiner* — Thomas M Wittenschlaeger
*Assistant Examiner* — Katie L Gerth
(74) *Attorney, Agent, or Firm* — Corinne R. Gorski

(57) ABSTRACT

A control valve, an impact device for a rock breaking apparatus, and a method are provided. The control valve is an elongated piece with a central axis and radial outer and inner surfaces (Ros, Ris). The control valve includes several control surfaces disposed at axial distances from each other for controlling hydraulic fluid flows (Hff) in response to axial control movement (M). One or more radial surfaces of the control valve include one or more slanted surface (SS) a longitudinal direction of which have oblique orientation in relation to the central axis (Ca) of the control valve. The control valve rotates or turns during a working cycle due to hydraulic flow effecting on the slanted surfaces.

8 Claims, 10 Drawing Sheets

(58) Field of Classification Search
CPC ..... B25D 9/18; F16K 11/078; F16K 11/0708; F16K 29/00
See application file for complete search history.

(56) References Cited

U.S. PATENT DOCUMENTS

| | | | | |
|---|---|---|---|---|
| 6,279,651 | B1 * | 8/2001 | Schwendemann | E21B 41/0035 166/54.1 |
| 6,554,074 | B2 * | 4/2003 | Longbottom | E21B 41/0085 166/66.4 |
| 7,537,053 | B1 * | 5/2009 | Hall | E21B 41/0085 166/242.6 |
| 8,800,425 | B2 * | 8/2014 | Koskimaki | B25D 9/18 91/317 |
| 11,174,679 | B2 * | 11/2021 | Bruandet | E21B 10/38 |
| 12,188,573 | B2 * | 1/2025 | Kawato | F16K 11/07 |
| 2002/0121377 | A1 * | 9/2002 | Longbottom | E21B 41/0085 166/66.4 |
| 2007/0151614 | A1 | 7/2007 | Dayton et al. | |
| 2010/0059242 | A1 * | 3/2010 | Koskimaki | B25D 17/245 91/189 A |
| 2012/0091732 | A1 * | 4/2012 | Fallet | E21B 41/0085 290/40 R |
| 2016/0003372 | A1 * | 1/2016 | Leino | E21B 4/14 251/12 |
| 2018/0163888 | A1 | 6/2018 | Ishikawa et al. | |
| 2019/0186236 | A1 * | 6/2019 | Asthana | E21B 43/12 |
| 2019/0249788 | A1 * | 8/2019 | Tanimura | F16K 3/24 |
| 2019/0257175 | A1 * | 8/2019 | Gao | E21B 33/13 |
| 2022/0003045 | A1 * | 1/2022 | von Gynz-Rekowski | E21B 34/108 |
| 2023/0294260 | A1 * | 9/2023 | Koskimaki | E21B 1/38 173/1 |

FOREIGN PATENT DOCUMENTS

| | | | |
|---|---|---|---|
| EP | 2906323 | B1 | 6/2018 |
| EP | 3919717 | A1 | 12/2021 |
| WO | 2012168559 | A1 | 12/2012 |

* cited by examiner

CONTROL VALVE AND IMPACT DEVICE

RELATED APPLICATION DATA

This application is a § 371 National Stage Application of PCT International Application No. PCT/EP2023/059116 filed Apr. 6, 2023 with priority to EP Application Serial No. 22168155.4 filed Apr. 13, 2022.

BACKGROUND OF THE INVENTION

The invention relates to a control valve of a hydraulic impact device of a rock breaking apparatus.

The invention further relates to an impact device and to a method of generating impacts in a hydraulic impact device of a rock breaking apparatus.

The field of the invention is defined more specifically in the preambles of the independent claims.

In rock drilling machines and other rock breaking apparatuses different type of hydraulic impact devices are used. The impact devices are provided with reciprocating percussion pistons working cycle of which is controlled by means of control valves. However, the known solutions have shown some disadvantages regarding durability of the control valves.

BRIEF DESCRIPTION OF THE INVENTION

An object of the invention is to provide a novel and improved control valve, impact device, and a method for generating impacts in a hydraulic impact device of a rock breaking apparatus.

The control valve according to the invention is characterized by the characterizing features of the first independent apparatus claim.

The impact device according to the invention is characterized by the characterizing features of the second independent apparatus claim.

The method according to the invention is characterized by the characterizing features of the independent method claim.

An idea of the disclosed solution is that a control valve of a hydraulic impact device of a rock breaking apparatus is an elongated piece with a central axis and radial outer and inner surfaces, and it also comprises several control surfaces at axial distances from each other for controlling hydraulic fluid flows in response to axial control movement. Further, at least one radial surface of the valve comprises at least one slanted surface longitudinal direction of which has oblique orientation in relation to the central axis of the valve. In other words, the control valve comprises one or more slanted surfaces at one or more surface areas being subjected to fluid flow during the operating cycle of the impact device. Thus, the fluid flow causes on the slanted surfaces torque around the central axis of the control valve and makes the control valve to rotate, or at least turn, in relation to its central axis. The control valve is a control sleeve comprising a central axial opening configured to serve as a fluid passage. In other words, the control sleeve can surround a percussion piston which can be arranged to the central axial opening.

An advantage of the disclosed solution is that the control valve changes automatically and without any external actuator or force its position in relation the central axis. Thereby it is possible to increase durability of the control valve. The control valve may be subjected to cavitation whereby cavitation damages of the control valve can be decreased. A further advantage is that manufacture of the slanted surfaces is easy and inexpensive. The use of the disclosed solution requires only slight modifications to the basic structure of the impact device.

According to an embodiment, the control valve is without any transverse openings passing the control valve in transverse direction. In other words, the control valve is a solid element with closed surfaces in transverse direction.

According to an embodiment, the slanted surface has axial dimension and extends on the surface of the control valve for a limited distance in axial direction.

According to an embodiment, the slanted surface has at least 10° pitch relative to the central axis of the control valve. The pitch may be 8-15°, for example.

According to an embodiment, the slanted surfaces have limited dimensions in axial direction of the control valve, i.e., the slanted surfaces do not extend end to end of the control valve.

According to an embodiment, the slanted surfaces extend end to end of the control valve.

According to an embodiment, the slanted surfaces of the control valve are formed by chip removing machining, such as milling.

According to an embodiment, the control valve is manufactured by means of additive manufacturing (AM).

According to an embodiment, the rock breaking apparatus is a rock drilling machine.

According to an embodiment, the rock breaking apparatus is alternatively a breaking hammer.

According to an embodiment, the radial outer surface is provided with several slanted surfaces. In other words, the generated rotational torque can be intensified by increasing number of the slanted surfaces.

According to an embodiment, number of the slanted surfaces at one cross-section may be 2-20.

According to an embodiment, the radial inner surface is provided with several slanted surfaces.

According to an embodiment, the slanted surface is linearly directed configuration on the radial surface of the control valve. In other words, shape of the slanted surface is straight and deviates thereby from curved or helical surfaces. An advantage of this solution is that the linearly directed slanted surface may be easier to manufacture.

According to an embodiment, the slanted surface has helical configuration in longitudinal direction of the slanted surface.

According to an embodiment, the slanted surface has uniform radial dimensions at least in one longitudinal part of the slanted surface.

According to an embodiment, the slanted surface has continuously changing radial dimensions at least in one longitudinal part of the slanted surface.

According to an embodiment, the control valve has a first end surface and an opposite second end surface. Further, several slanted surfaces extend to at one of the mentioned first end surface and second end surface.

According to an embodiment, the control valve has at least one control shoulder on at least one of the mentioned inner radial surface and outer radial surface. The mentioned at least one control shoulder is provided with several slanted surfaces.

According to an embodiment, the slanted surface has groove-like configuration. In other words, the groove comprises an oblique surface portion or wall facing towards hydraulic fluid flow passing the surface of the control valve during the operation whereby the torque is generated on that surface.

According to an embodiment, the groove has constant cross section from end to end.

According to an embodiment, cross sectional shape of the groove changes when examined in longitudinal direction of the groove.

According to an embodiment, bottom of the groove is inclined. Inclination angle of the bottom may be 10-20°, for example about 15°.

According to an embodiment, the slanted surface has protrusion-like configuration. In other words, the control valve may comprise one or more longitudinal slanted protrusions, such as ridges, bulges, elevations, or spirals. Then there is an oblique surface portion or wall facing towards hydraulic fluid flow passing the surface of control valve during the operation whereby the torque is generated on that surface.

According to an embodiment, the control valve has a first set of several first slanted surfaces and a second set of several second slanted surfaces at an axial distance from the first set. The first and second slanted surfaces have oppositely directed oblique orientations relative to each other. In other words, the control valve can control fluid flows having opposite flow directions relative to each other. Then the first set is influenced by first fluid flow having first direction of flow, and the second set is influenced by second fluid flow having second direction. The first and second sets are configured to turn the control valve to the same rotation direction when being influenced by the first and second fluid flows.

According to an embodiment, the disclosed solution relates to an impact device of a rock breaking apparatus comprising: a body; a percussion piston being movable in an impact direction towards a front end of the impact device and in a reverse direction towards a rear end of the impact device; a working pressure space provided with hydraulic pressure fluid for moving the percussion piston in the reverse direction; a control pressure space at a rear end of the valve cylinder and being provided with a control valve for controlling hydraulic pressure affecting at the control pressure space and to thereby controlling reciprocating movement of the percussion piston; and wherein the control valve is configured to be rotated hydraulically during the operation of the impact device. Further, the control valve comprises several slanted surfaces on at least one radial surface of the control valve for generating torque for providing the hydraulic rotation. The control valve is in accordance with the embodiments and features disclosed in this document.

The above disclosed embodiments may be combined in order to form suitable solutions having those of the above features that are needed.

BRIEF DESCRIPTION OF THE FIGURES

Some embodiments are described in more detail in the accompanying drawings, in which.

For the sake of clarity, the figures show some embodiments of the disclosed solution in a simplified manner. In the figures, like reference numerals identify like elements.

DETAILED DESCRIPTION OF SOME EMBODIMENTS

Figure 1:
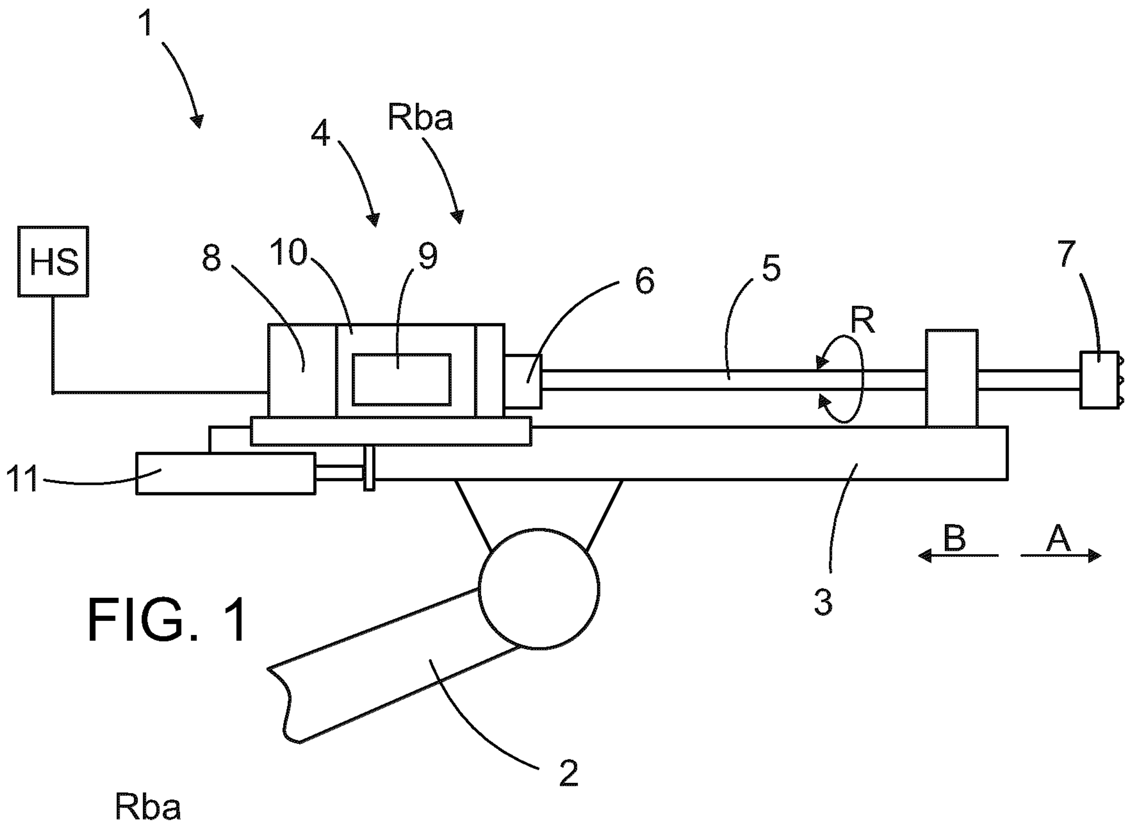
FIG. 1 is a schematic side view of a rock drilling unit provided with a hydraulic rock drilling machine.

FIG. 1 shows a rock drilling unit 1 intended for drilling holes to a rock surface. The rock drilling unit 1 is typically mounted to a drilling boom 2 of a rock drilling rig. The drilling unit 1 is provided with a feed beam 3 and a rock drilling machine 4 supported on it. A drilling tool 5 is connectable to the drilling machine 4. The rock drilling machine 4 may comprise a shank adaptor 6 at a front end of the rock drilling machine 4 for connecting the tool 5. At an opposite end of the tool 5 is a drill bit 7. The rock drilling machine 4 comprises an impact device 8 for providing the drilling tool 5 with impact pulses for breaking the rock, and a rotating device 9 for rotating R the drilling tool 5 around its longitudinal axis. The rock drilling machine 4 further comprises a basic body 10 for mounting the impact device 8, the rotating device 9, and possible other devices and elements needed. The rock drilling machine 4 may be moved on the feed beam 3 by means of a feed device 11 in a drilling or feed direction A and in a return direction B. The rock drilling machine 4 is hydraulically operable whereby the impact device 8 and the rotating device 9 are connected to a hydraulic system HS. Further, the impact device 8 may be in accordance with the solution disclosed in this document and may thereby comprise the disclosed rotating control valve.

Figure 2:
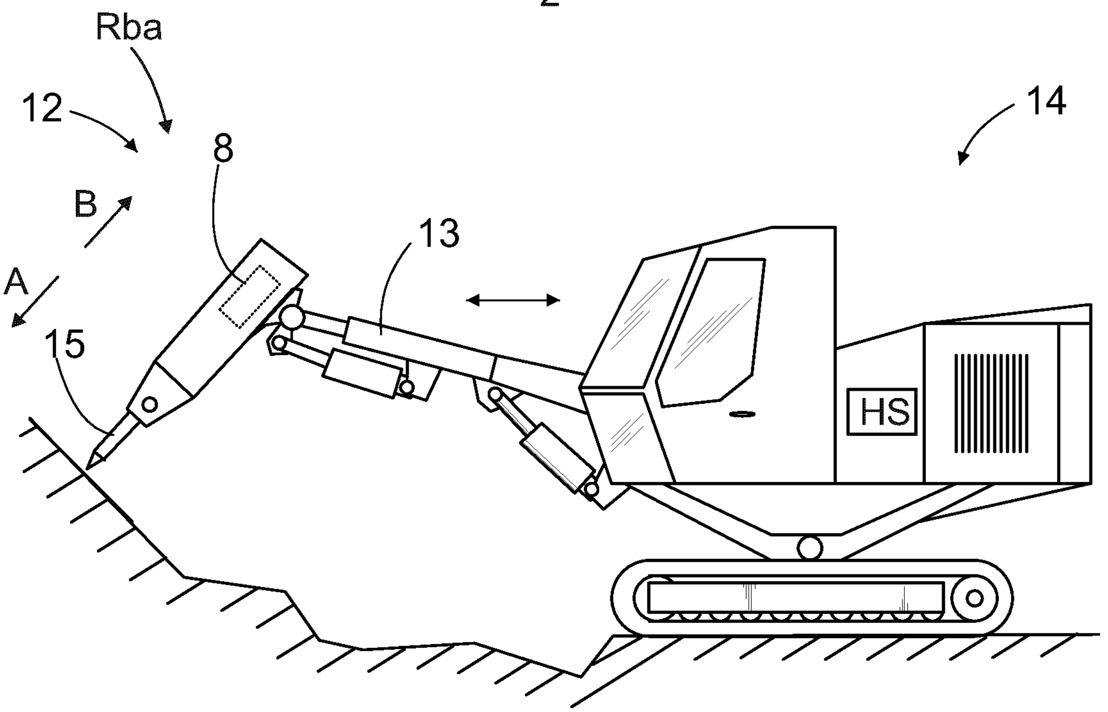
FIG. 2 is a schematic side view of an excavator provided with a hydraulic breaking hammer.

FIG. 2 discloses a hydraulic breaking hammer 12 mounted to a boom 13 of an excavator 14 and connected to a hydraulic system HS of the excavator 14. The breaking hammer 12 comprises a hydraulic impact device 8 for generating impact pulses to a breaking tool 15 connectable to the breaking hammer 12. The breaking tool 15 can move in an impact direction A and a return direction B during the rock breaking. The impact device 8 may be in accordance with the solution disclosed in this document and may thereby comprise the disclosed rotating control valve.

In FIGS. 1 and 2 rock breaking apparatuses, such as the rock drilling machine 4 and the hydraulic breaking hammer 12, are indicated with a reference Rba.

Figure 3:
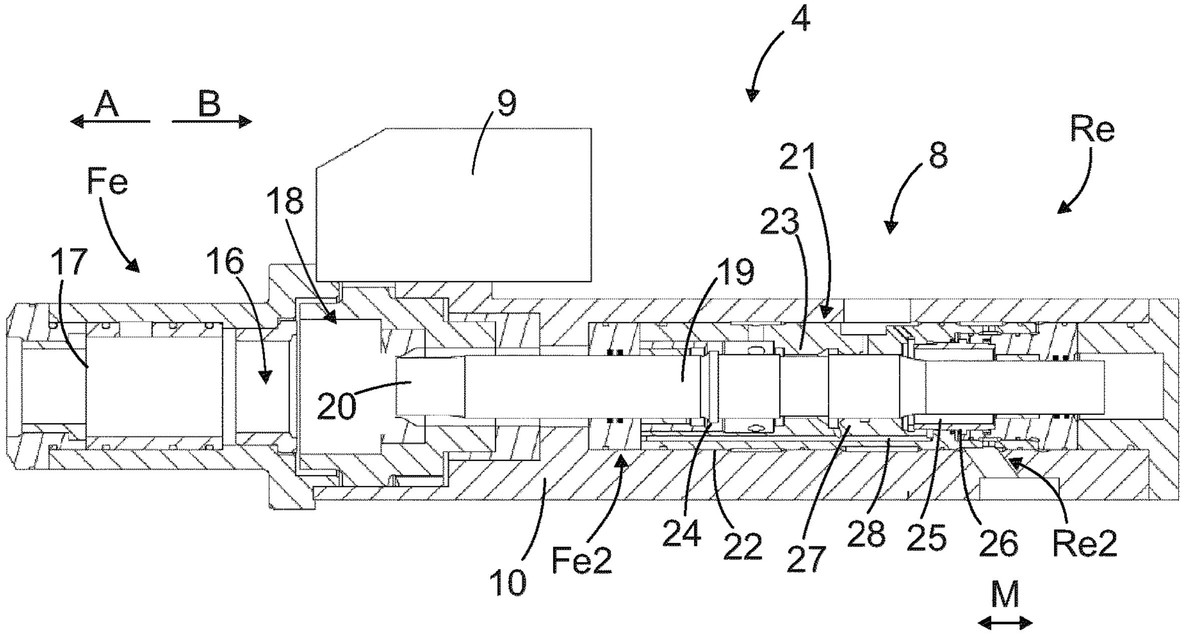
FIG. 3 is a schematic and cross-sectional side view of a rock drilling machine comprising a hydraulic impact device.

FIG. 3 discloses a rock drilling machine 4 comprising a body 10, an impact device 8, a rotating device 9, a flushing housing 16, an open space 17 for receiving a shank adaptor, and a gear housing 18. The flushing housing 16 and gear housing 18 are located at a front end Fe of the body 10, whereas the impact device 8 is located at a rear end Re. The shank adapter can be mounted to the open space 17 and its rear end can be connected to rotating elements at the gear housing 18 so that the shank adapter and a drilling tool connectable to the shank adapter can be rotated by means of the rotating device 9. Flushing fluid can be fed via the flushing housing 16 to an axial flushing channel of the shank adapter and further to the drilling tool.

The impact device 8 comprises a percussion piston 19 which is arranged to move in a reciprocating manner in the impact direction A and return direction B. At a front end of the percussion piston 19 is an impact surface 20 which is configured to strike the shank adapter. The impact device 8 may comprise a percussion cartridge 21 which is arranged axially inside a rear portion Re2 of a central space 22 of the body 10. The percussion cartridge 21 may comprise a valve cylinder 23 through which the percussion piston 19 passes. The impact device 8 comprises a working pressure space 24 provided with hydraulic pressure fluid for moving the percussion piston 19 in the reverse direction B. There is a control pressure space 25 at a rear end Re2 of the valve cylinder 23. The control pressure space 25 is provided with a sleeve-like control valve 26 for controlling hydraulic pressure affecting at the control pressure space 25 and to thereby control reciprocating movement of the percussion piston 19. The pressure in the control valve space 25 moves the percussion piston 19 in the impact direction because working pressure areas of the percussion piston in the impact direction A are greater therein compared to working pressure areas or the percussion piston at the working pressure space 24 and affecting in the return direction B. In the working pressure space 24 there may prevail continuous high pressure during the operation, whereas in the control pressure space 25 magnitude of the pressure can be changed by means of the control valve 26 for making the percussion piston 19 to execute the reciprocating movement. Further, the valve cylinder 23 is provided with a pilot pressure space 27 for providing pressure pulses in response to movement of the percussion piston 19 in the impact direction A. The valve cylinder 23 is further provided with several axial fluid channels 28 for connecting the pilot pressure space 27 and the control pressure space 25. The pressure pulses generated in the pilot pressure space 27 effect on control surfaces of the control valve 26 and make it to change its control position.

The control valve 26 is an elongated piece with a central axis and radial outer and inner surfaces, and it comprises several control surfaces at axial distances from each other for controlling hydraulic fluid flows in response to axial control movement. Furthermore, one or more radial surfaces i.e., inner or outer surfaces, of the control valve 26 comprise one or several slanted surfaces longitudinal direction of which have oblique orientation in relation to the central axis of the control valve. Possible configurations of the slanted surfaces are disclosed in FIGS. 5-17.

The impact device 8 disclosed in FIG. 3 may be utilized also in a rock breaking hammer. Then there is no rotating device, gearing housing, flushing housing and the shank adapter. The percussion piston may be arranged to strike to an impact surface of a breaking tool.

Figure 4:
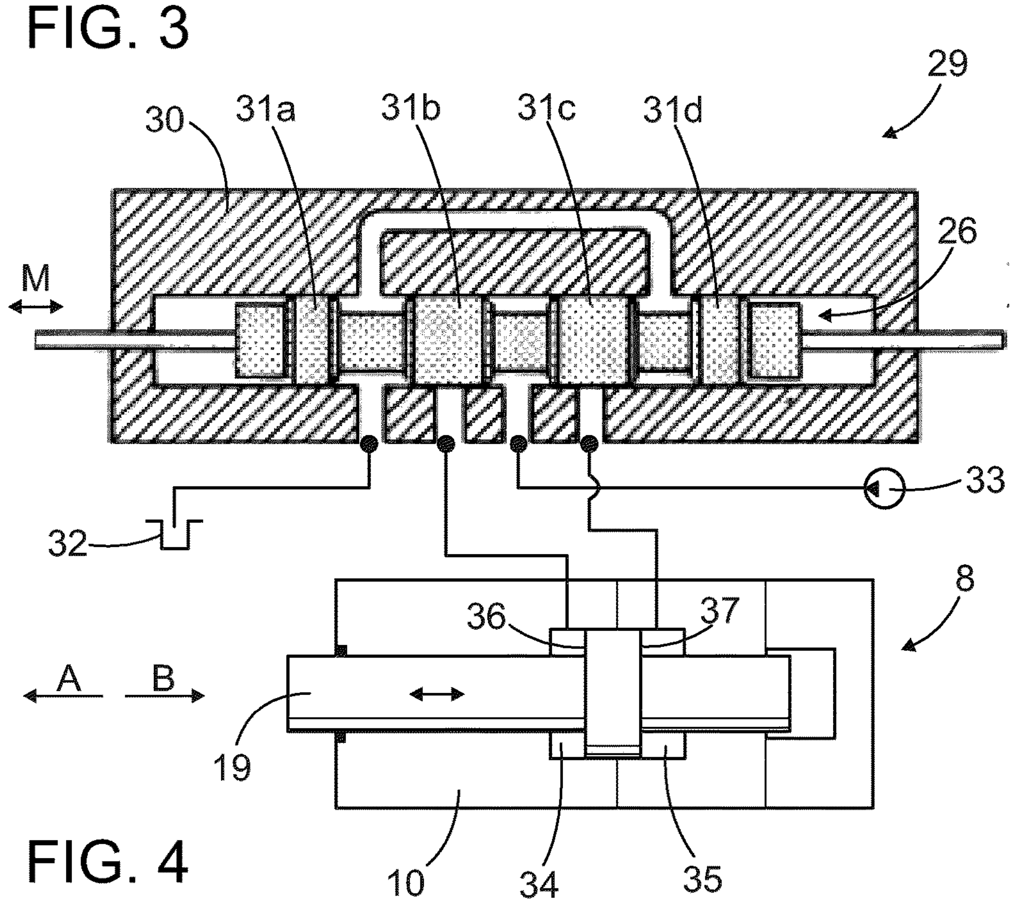
FIG. 4 is a schematic side view of an impact device controlled by means of a spool valve.

FIG. 4 discloses in a simplified view another type of an impact device 8 and a valve system for controlling reciprocating operation of a percussion piston 19. The valve system comprises a spool valve 29 provided with an elongated shaft-like control valve 26 which is arranged axially movably inside a valve housing 30. The control valve 26 comprises several control surfaces 31*a*-31*d* at axial distances from each other for controlling hydraulic fluid flows in response to the axial control movement M. Thus, the control valve 26 can open and close connections between a tank 32, hydraulic pump 33, a first working pressure space 34 of the impact device 8, and a second working pressure space 35 of the impact device 8 to thereby control the movement of the percussion piston 19 in impact direction A and return direction B. Hydraulic pressure effects on working pressure surfaces 36 and 37 and cause the axial movement. Further, one or more radial outer surfaces of the control valve 26 comprises one or several slanted surfaces longitudinal direction of which have oblique orientation in relation to the central axis of the control valve 26. Possible configurations of the slanted surfaces on the control valve 26 are disclosed in FIGS. 18-21.

In FIG. 4 the control valve 26 is alternating pressure prevailing in working pressures spaces 34 and 35, but in an alternative solution the pressure may be changed only in one working pressure space when working pressure areas are dimensioned accordingly.

Figure 5:
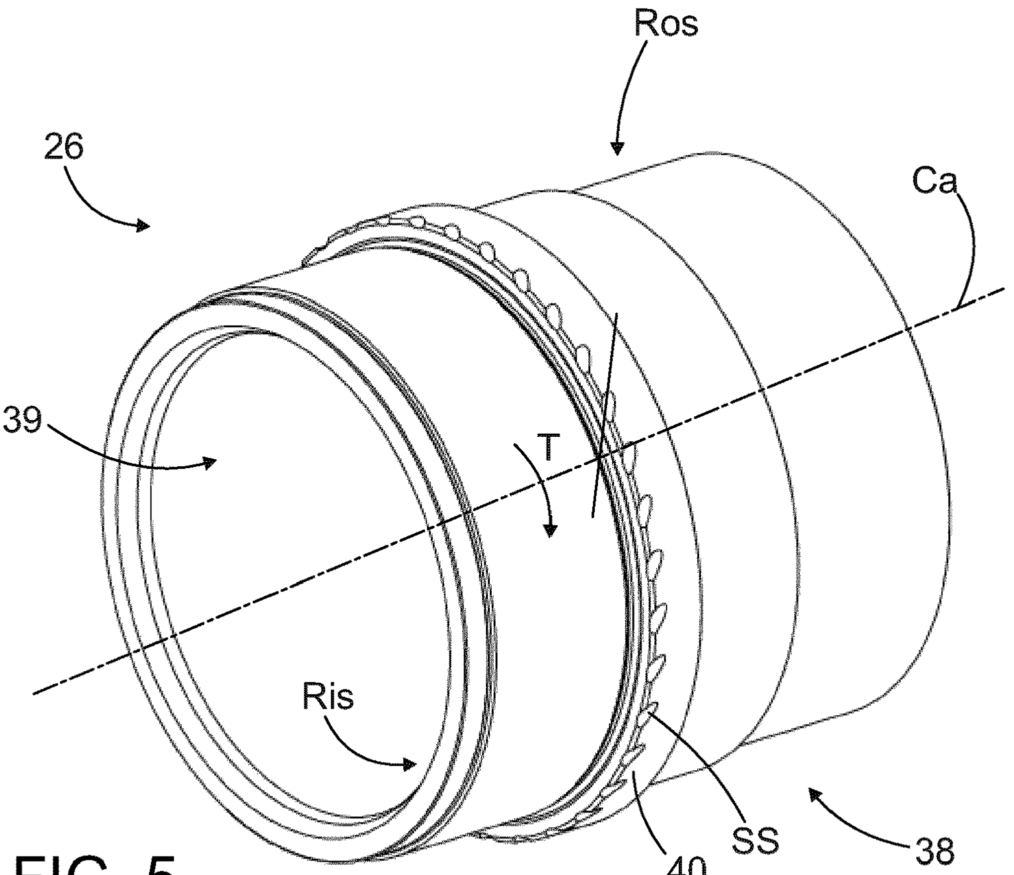
FIGS. 5-17 are schematic views of some sleeve-like control valves provided with slanted surfaces causing desired rotation during their operation cycles.
Figure 6:
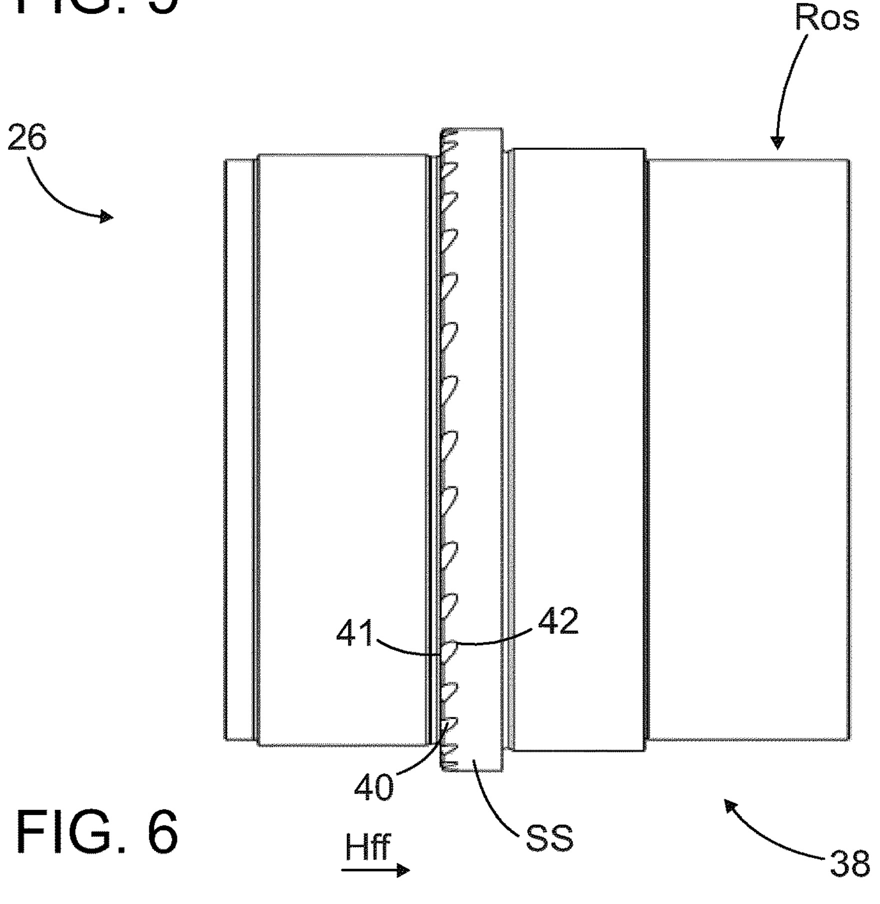

FIGS. 5 and 6 disclose a control valve 26 which is a control sleeve 38 comprising central axis Ca and a central axial opening 39 configured to serve as a fluid passage. The control sleeve 38 has radial outer surfaces Ros and radial inner surfaces Ris. The control valve 26 has a control shoulder 40 on the radial outer surface Ros. The control shoulder 40 is provided with several slanted surfaces SS. The slanted surfaces SS have groove-like configuration. When hydraulic fluid flow is directed to these slated surfaces SS, torque T is generated and the control sleeve 38 can turn. Direction of the hydraulic fluid flow Hff is indicated by an arrow. FIG. 6 shows that the slanted surfaces 40 have continuously changing radial dimensions. This can be noted since the slanted surfaces have wider left side edge 41 which narrows towards a right side edge 42.

Figure 7:
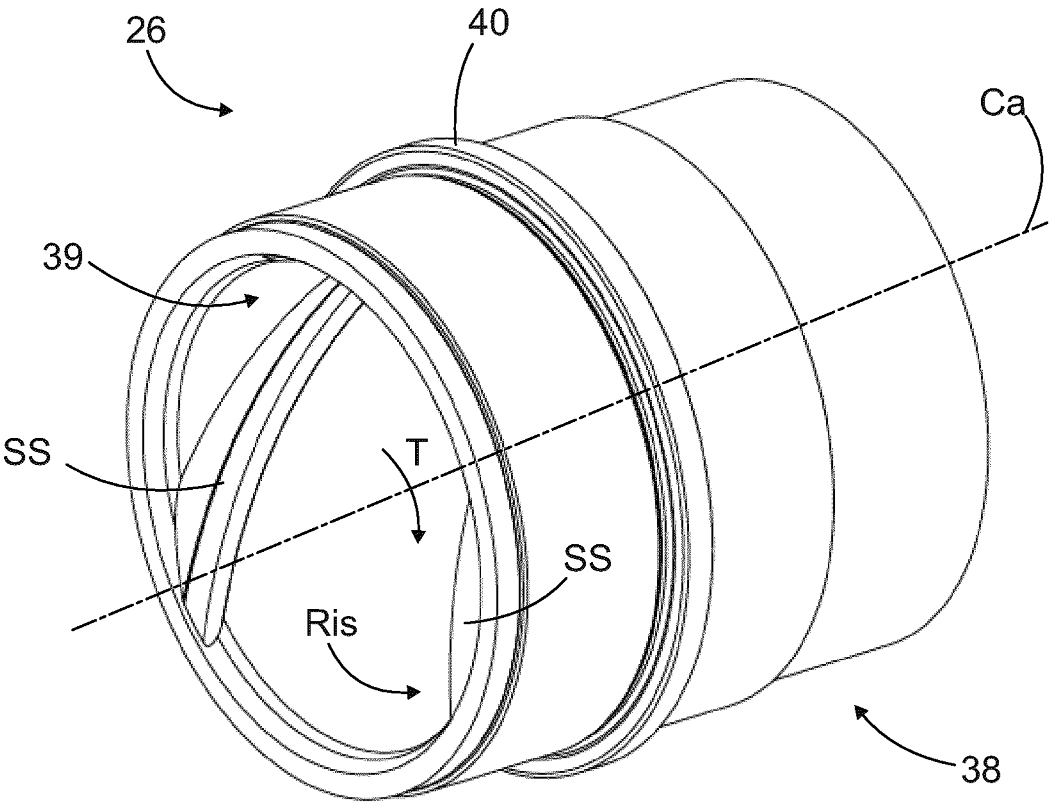
Figure 8:
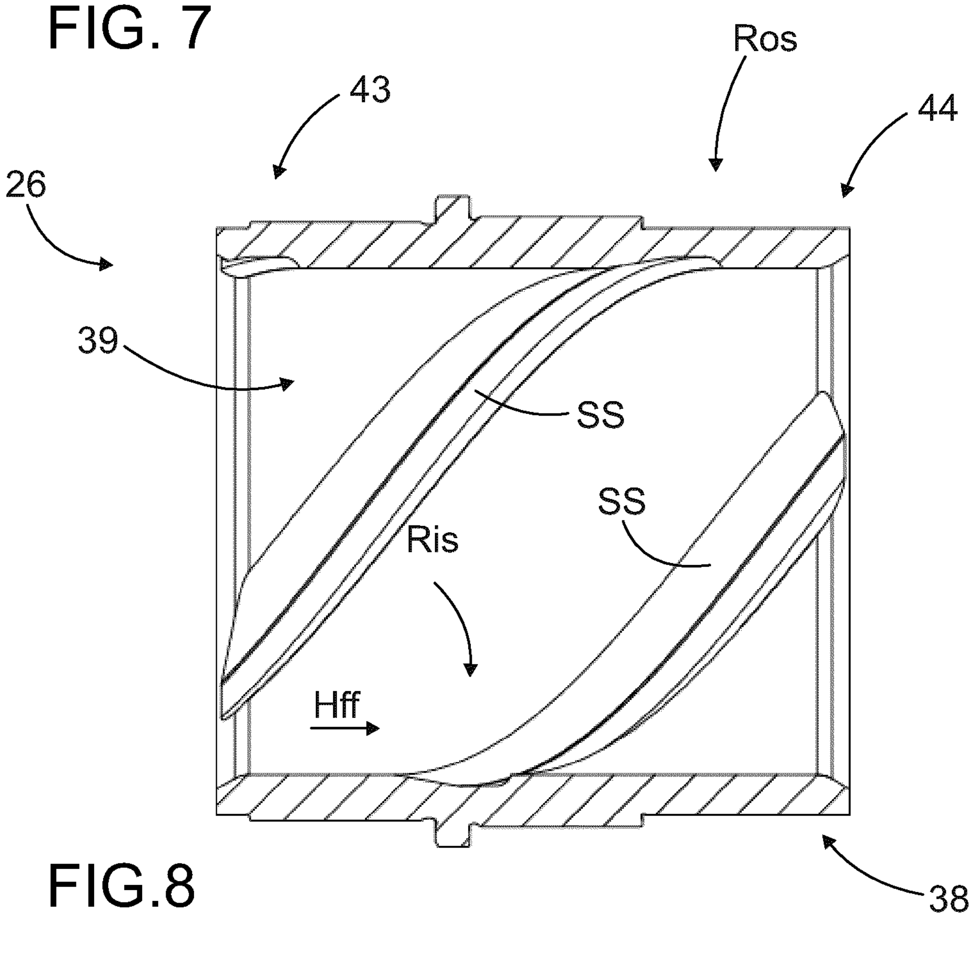

FIGS. 7 and 8 disclose a control valve 26 which is a control sleeve 38 and comprises slanted surfaces SS on its radial inner surfaces Ris. The slanted surfaces SS are grooves and have helical configuration in longitudinal direction of the slanted surface SS. When hydraulic fluid flow Hff is directed to these slated surfaces SS, torque T is generated and the control sleeve 38 can turn.

Figure 9:
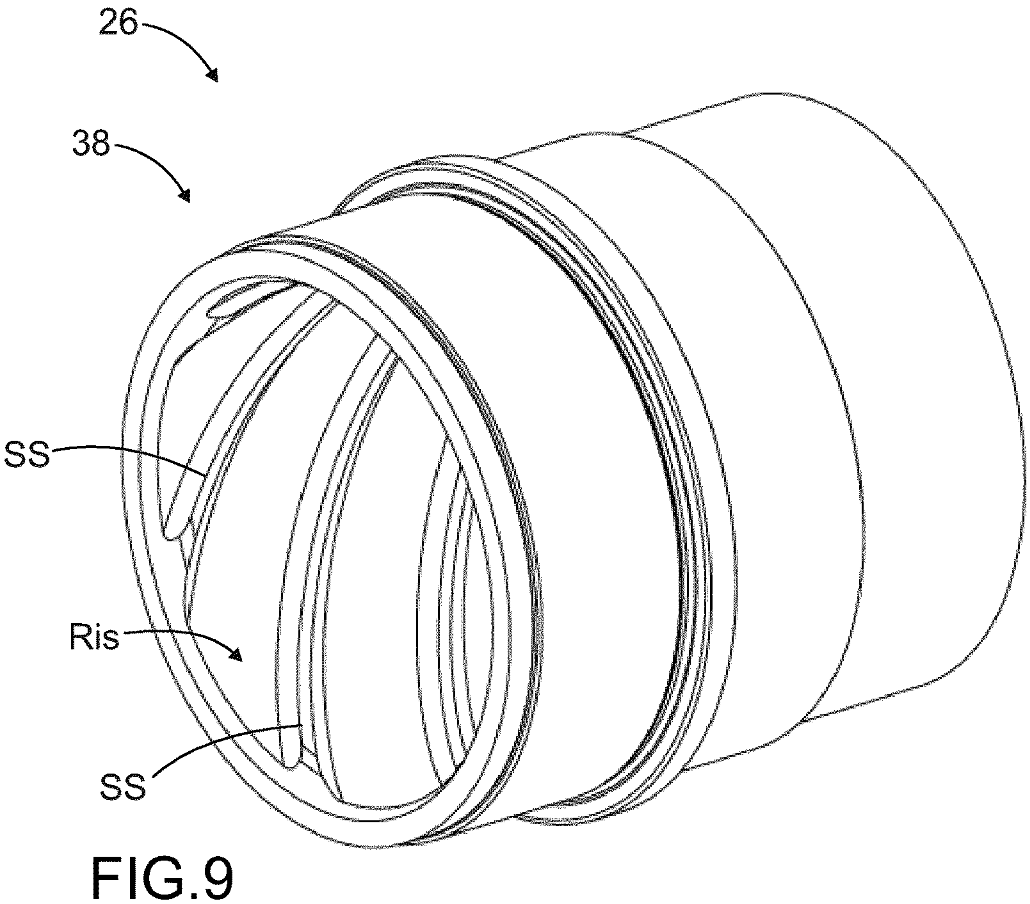
Figure 10:
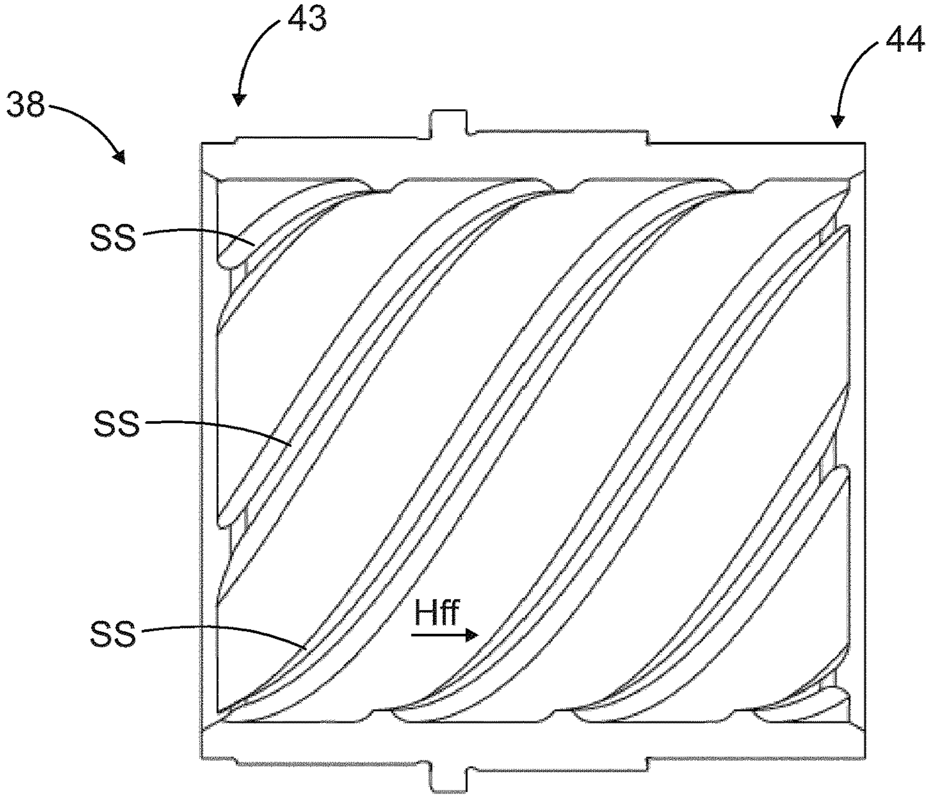

FIGS. 9 and 10 disclose a control sleeve 38 which differs from the one shown in FIGS. 7 and 8 in that number of the slanted surfaces SS, i.e., the number of the helical grooves on the radial inner surfaces is greater.

Further, the control sleeves 38 have first end surfaces 43 and opposite second end surfaces 44, and the helical grooves extend from end the end in FIGS. 7-10. Then surface areas of the slanted surfaces SS are great and effective torque T can be generated. The grooves forming the slanted surfaces SS may have constant depth, as it is shown in FIGS. 7-11.

Figure 11:
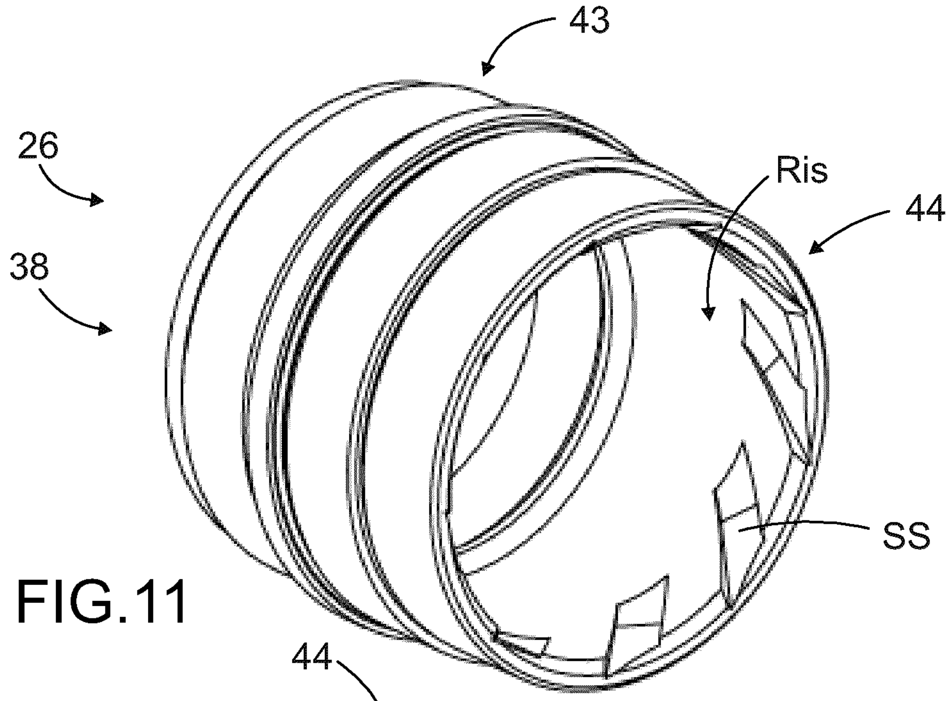
Figure 12:
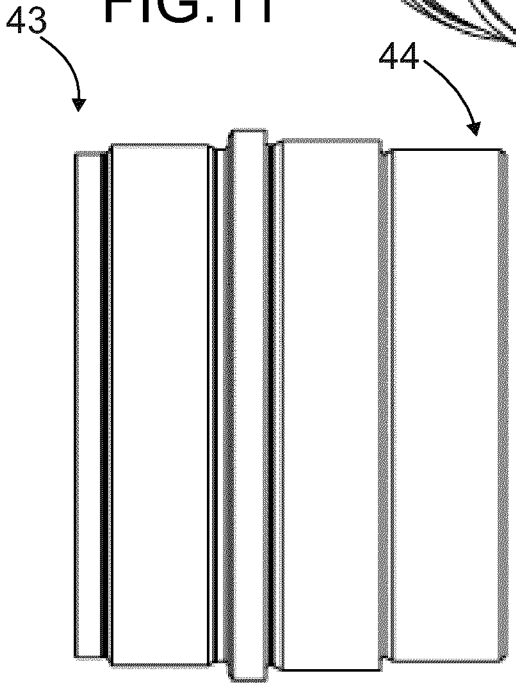
Figure 13:
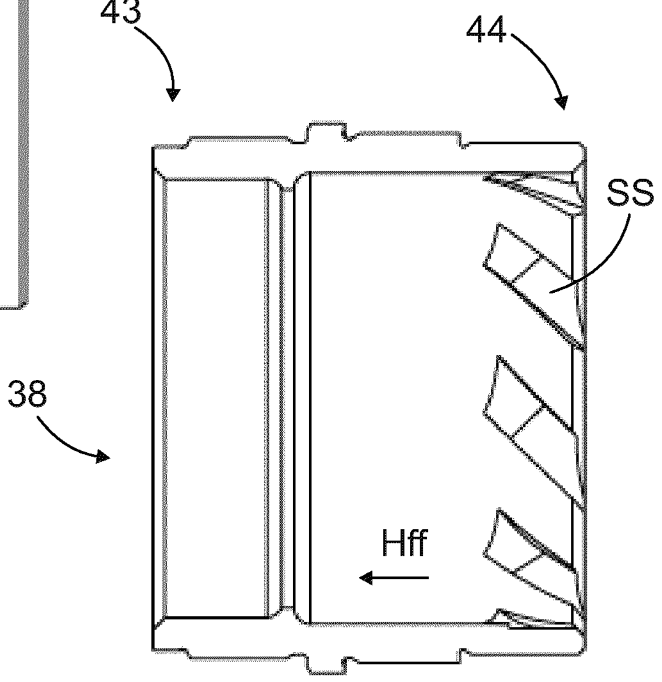

FIGS. 11-13 disclose a control sleeve 38 which is provided with several slanted surfaces SS on its radial inner surfaces Ris at second end surfaces 44.

Figure 14:
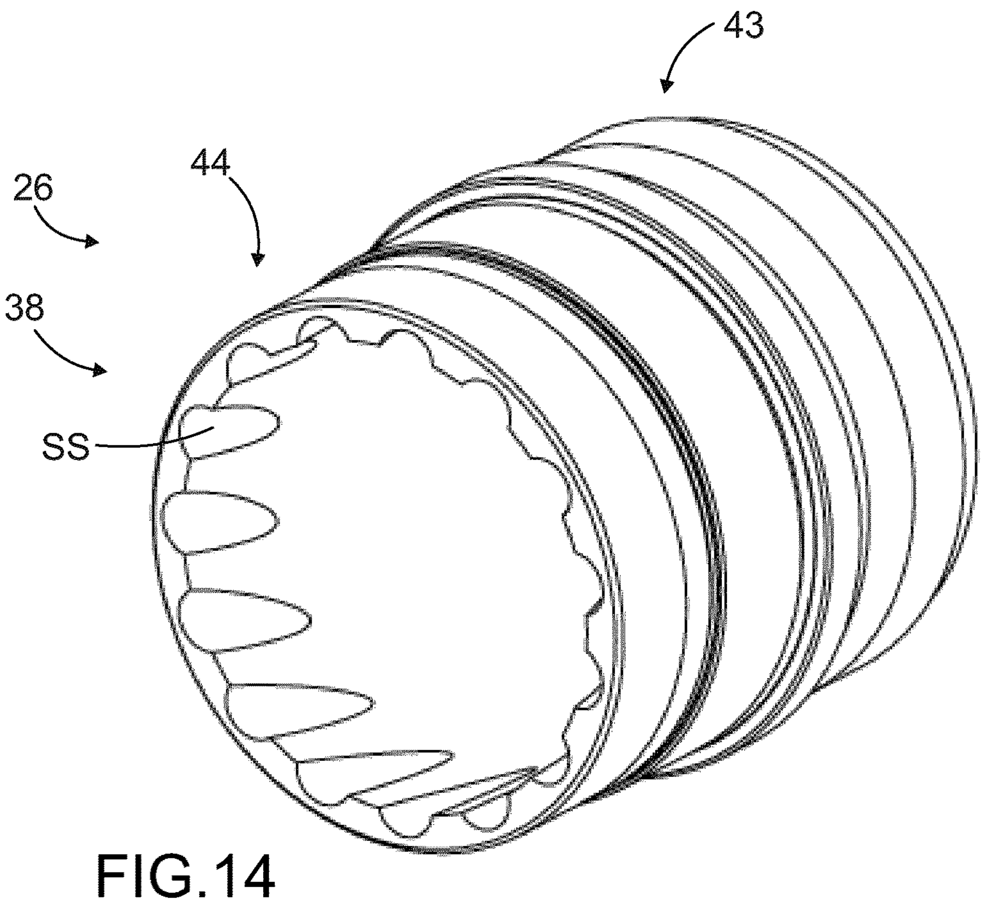
Figure 15:
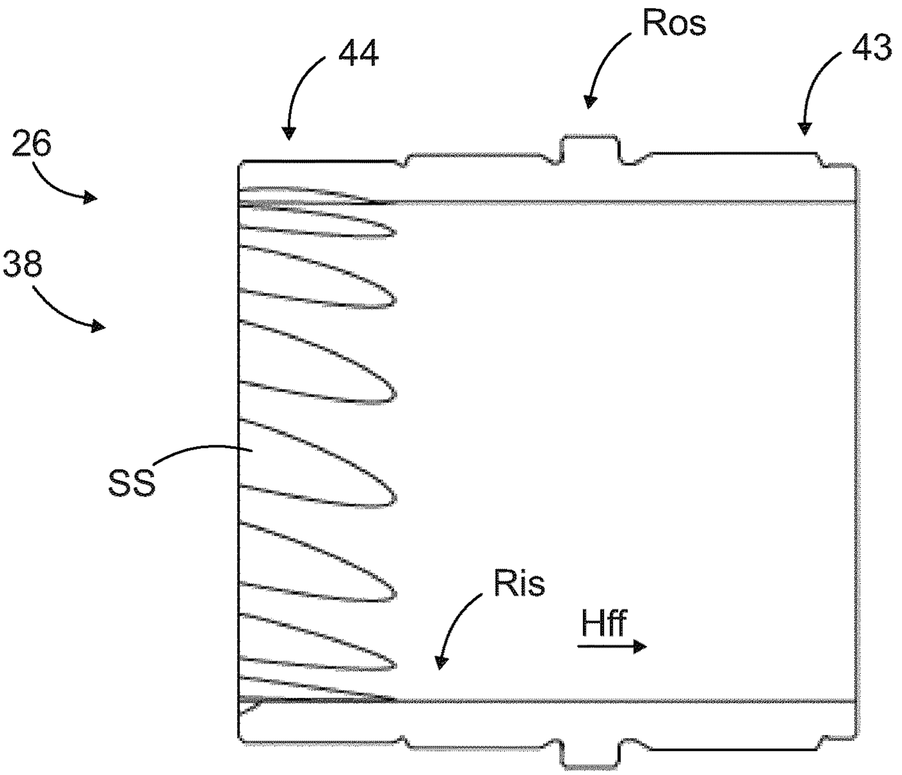

FIGS. 14 and 15 disclose a control sleeve 38 which is provided with several slanted surfaces SS on its radial inner surfaces Ris at first end surfaces 44. As can be seen, shape of groove-like slanted surfaces SS vary continuously in their length direction. In other words, width and depth of the grooves diminish towards the second end 43.

Figure 16:
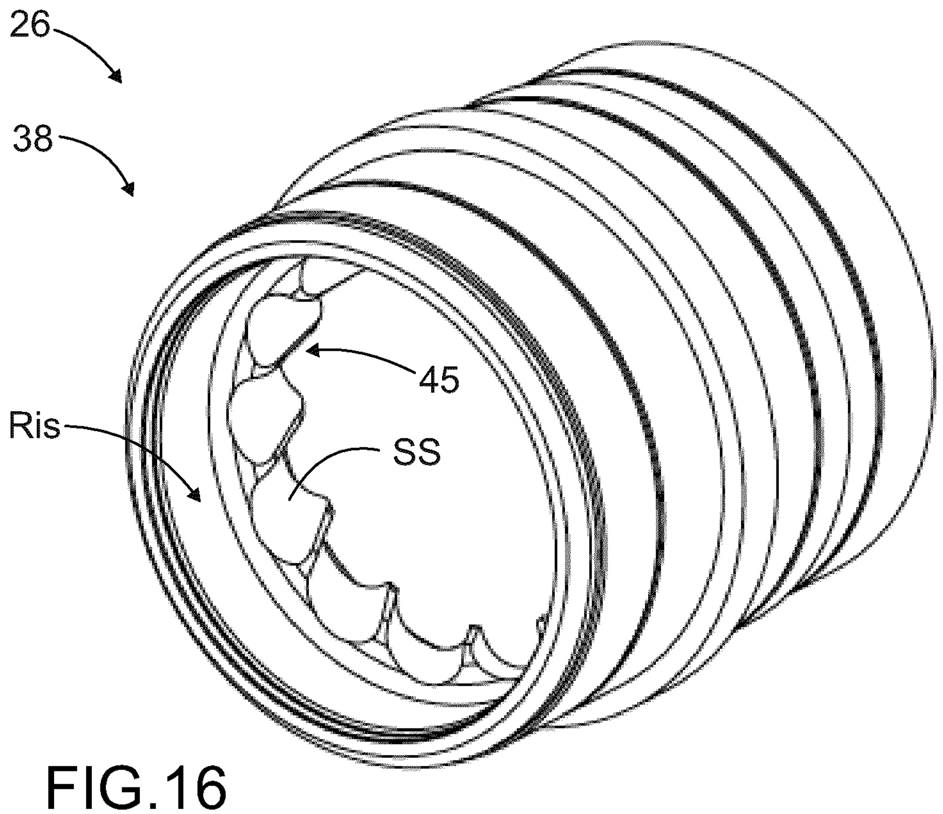
Figure 17:
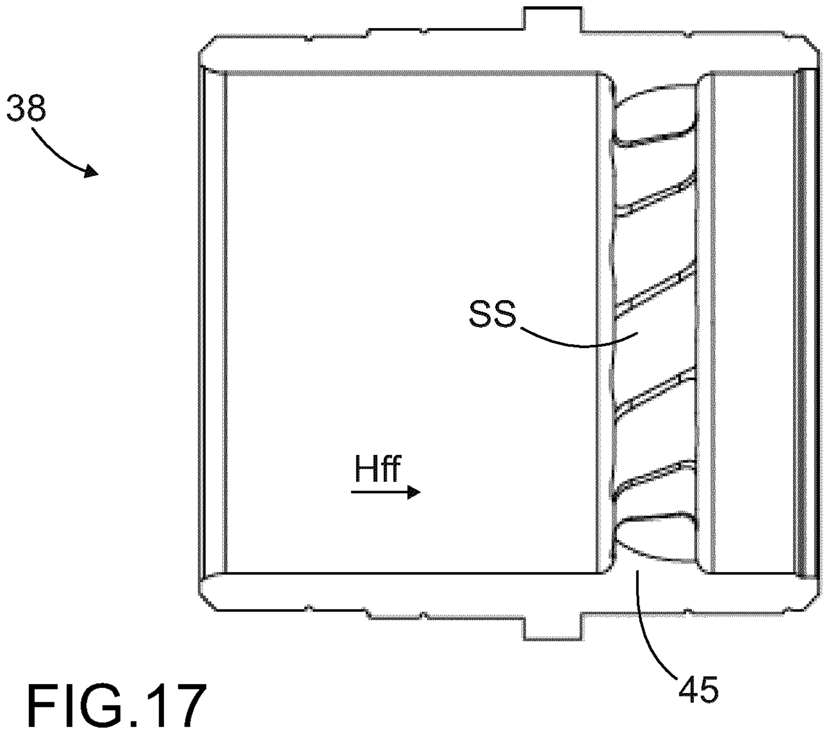

FIGS. 16 and 17 disclose a control sleeve 38 which is provided with several slanted surfaces SS on an inner control shoulder 45.

Further, different combinations of the solutions disclosed in FIGS. 4-17 can also be implemented. Thus, it may be possible to arrange the slanted surfaces on both the radial inner and outer surfaces. There may also be a combination of protruding and groove like slanted surfaces.

Figure 18:
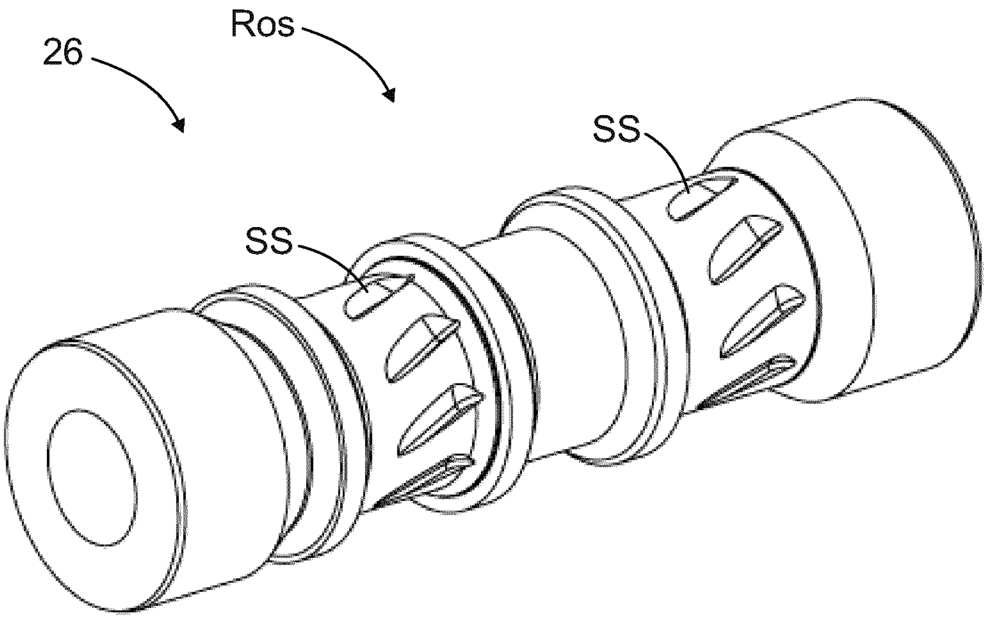
FIGS. 18-21 are schematic views of some shaft-like control valves for spool valves and being provided with slanted surfaces causing desired rotation during their operation cycles.
Figure 19:
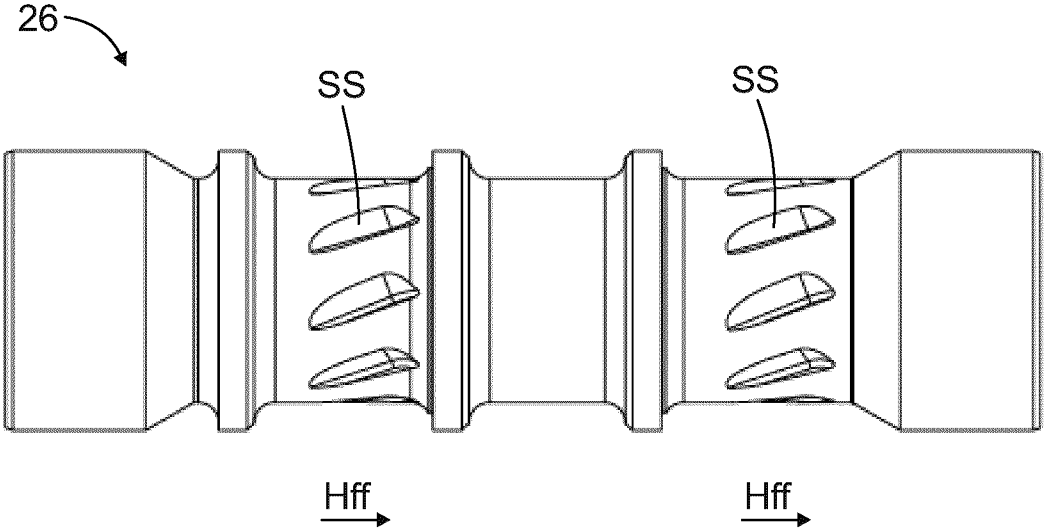

FIGS. 18 and 19 disclose a shaft-like control valve 26 of a spool valve. On a radial outer surface Ros of the control valve 26 there are two sections provided with slanted surfaces SS. The slanted surfaces SS may be grooves cross-section of which change along their length. The slanted surfaces SS are arranged at sections where occurs hydraulic fluid flow Hff which makes the control valve 26 turn by the help of the slanted surfaces SS.

Figure 20:
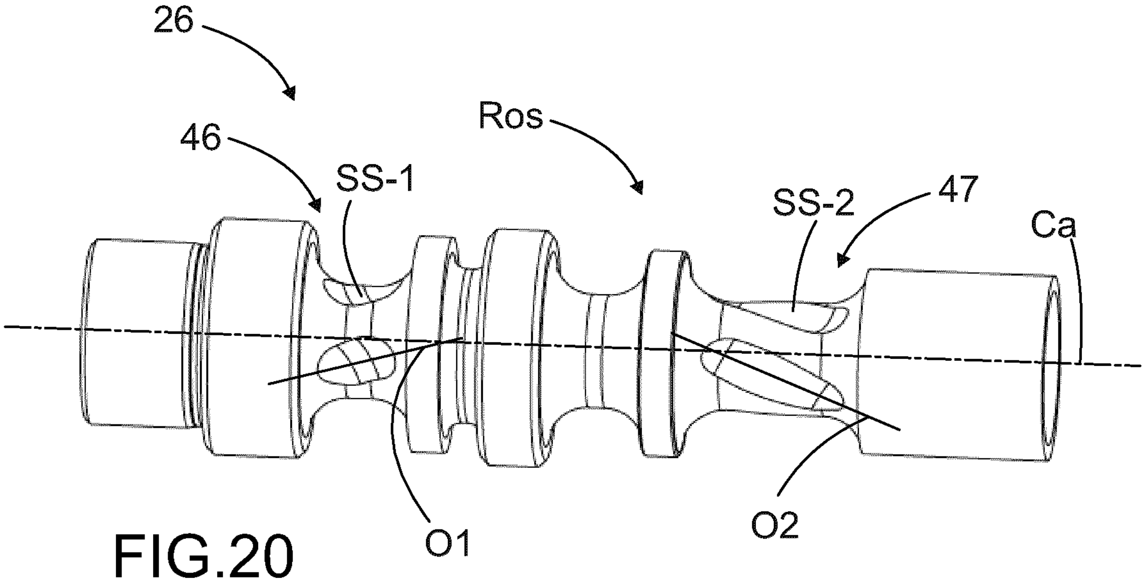
Figure 21:
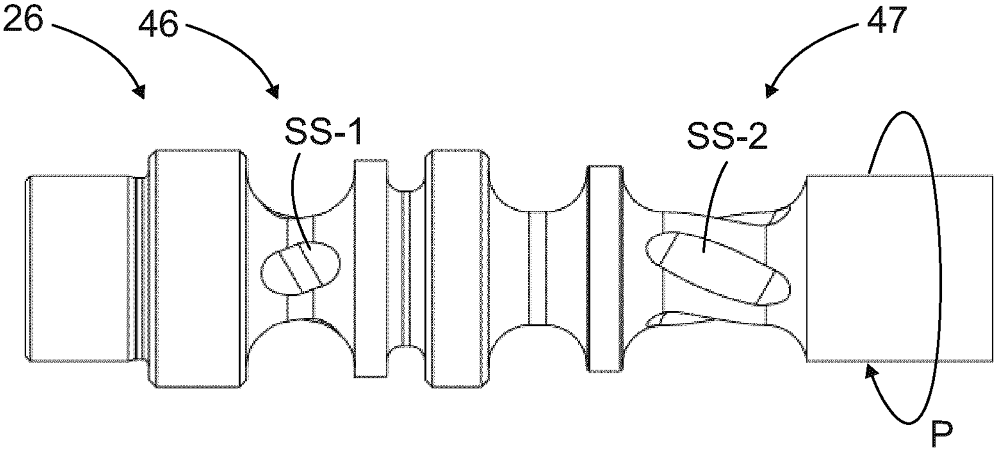

FIGS. 20 and 21 also disclose a shaft-like control valve 26 of a spool valve. The control valve 26 differs from the one shown in FIGS. 18 and 19 in that there are a first set 46 of several first slanted surfaces SS-1 and a second set 47 of several second slanted surfaces SS-2 at an axial distance from the first set SS-1. The first and second slanted surfaces SS-1, SS-2 have oppositely directed oblique orientations O1, O2 relative to each other. In other words, the control valve 26 can control fluid flows having opposite flow directions Hff1, Hff2 relative to each other. Then the first set 46 is influenced by first fluid flow Hff1 having first direction of flow, and the second set 47 is influenced by second fluid flow Hff2 having second direction. The first and second sets 46, 47 are configured to turn P the control valve 26 to the same rotation direction when being influenced by the first and second fluid flows Hff1, Hff2.

FIGS. 20 and 21 also show, that the control valve 26 may comprise slanted surfaces SS-1 and SS-2 which have different shapes and dimensions.

The drawings and the related description are only intended to illustrate the idea of the invention. In its details, the invention may vary within the scope of the claims.

The invention claimed is:

1. A control valve for a hydraulic impact device of a rock breaking apparatus, wherein the control valve is an elongated piece with a central axis and radial outer and inner surfaces, the control valve comprising:

several control surfaces located at axial distances from each other and arranged for controlling hydraulic fluid flows in response to an axial control movement, wherein the control valve is configured to be rotated hydraulically during operation of the impact device, wherein the control valve is without any transverse openings passing in the control valve in a transverse direction;

the at least one of the radial outer and inner surface including at least one slanted surface for generating torque for providing the hydraulic rotation, a longitudinal direction of which has an oblique orientation in relation to the central axis of the control valve, wherein the at least one slanted surface comprises a plurality of slanted surfaces, the radial inner surface being provided with the plurality of slanted surfaces;

the control valve being a control sleeve including a central axial opening configured as a fluid passage.

2. The control valve as claimed in claim 1, wherein the at least one slanted surface is linearly directed on the inner radial surface of the control valve.

3. The control valve as claimed in claim 1, wherein the at least one slanted surface has a helical configuration in the longitudinal direction of the at least one slanted surface.

4. The control valve as claimed in claim 1, wherein the at least one slanted surface has uniform radial dimensions at least in one longitudinal part of the at least one slanted surface.

5. The control valve as claimed in claim 1, wherein the at least one slanted surface has continuously changing radial dimensions at least in one longitudinal part of the at least one slanted surface.

6. The control valve as claimed in claim 1, further comprising a first end surface and an opposite second end surface wherein the plurality of slanted surfaces extends to at one of the first end surface and second end surface.

7. The control valve as claimed in claim 1, wherein the at least one slanted surface has a groove shaped configuration.

8. An impact device of a rock breaking apparatus, the impact device comprising:

a body;

a percussion piston being movable within a valve cylinder in an impact direction towards a front end of the impact device and in a reverse direction towards a rear end of the impact device;

a working pressure space provided with hydraulic pressure fluid for moving the percussion piston in the reverse direction;

a control pressure space at a rear end of the valve cylinder and being provided with a control valve in accordance with claim 1, the control valve being arranged for controlling hydraulic pressure affecting at the pressure space and to thereby controlling reciprocating movement of the percussion piston, wherein the control valve is configured to be rotated hydraulically during the operation of the impact device, wherein the control valve includes at least one slanted surface located on at least one radial surface of the control valve for generating torque for providing the hydraulic rotation.

* * * * *